US009532516B2

(12) United States Patent
Church et al.

(10) Patent No.: US 9,532,516 B2
(45) Date of Patent: Jan. 3, 2017

(54) APPARATUS AND METHOD FOR GROWING PLANTS HYDROPONICALLY IN CONTAINERS

(71) Applicant: Dow Agrosciences LLC, Indianapolis, IN (US)

(72) Inventors: Jeffrey B. Church, Carmel, IN (US); Larry Boyd Rowland, Indianapolis, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 135 days.

(21) Appl. No.: 13/803,426

(22) Filed: Mar. 14, 2013

(65) Prior Publication Data

US 2014/0182203 A1    Jul. 3, 2014

Related U.S. Application Data

(60) Provisional application No. 61/746,374, filed on Dec. 27, 2012.

(51) Int. Cl.
*A01G 31/02* (2006.01)

(52) U.S. Cl.
CPC ............. *A01G 31/02* (2013.01); *Y02P 60/216* (2015.11)

(58) Field of Classification Search
CPC ...... A01G 31/02; A01G 31/00; A01G 31/001; A01G 2031/006
See application file for complete search history.

(56) References Cited

U.S. PATENT DOCUMENTS

| 2,486,512 | A   |   | 11/1949 | Armstrong |              |
|-----------|-----|---|---------|-----------|--------------|
| 3,589,389 | A   | * | 6/1971  | Nilsson   | 137/403      |
| 3,823,508 | A   |   | 7/1974  | Takehara  |              |
| 4,133,141 | A   |   | 1/1979  | Lee       |              |
| 4,185,414 | A   | * | 1/1980  | Miller    | 47/62 C      |
| 4,676,023 | A   | * | 6/1987  | Mori      | 47/82        |
| 4,953,322 | A   |   | 9/1990  | Edwards   |              |
| 5,054,690 | A   |   | 10/1991 | Olson     |              |
| 5,826,374 | A   |   | 10/1998 | Baca      |              |
| 6,247,269 | B1  |   | 6/2001  | Valiquette|              |
| 6,345,470 | B1  |   | 2/2002  | Slaght et al. |          |
| 7,594,355 | B1  |   | 9/2009  | Aagaard   |              |
| 7,823,328 | B2  | * | 11/2010 | Walhovd   | A01G 31/02   |
|           |     |   |         |           | 47/62 A      |
| 7,877,927 | B2  |   | 2/2011  | Roy et al.|              |
| 7,975,430 | B2  |   | 7/2011  | Scott     |              |
| 8,065,833 | B2  | * | 11/2011 | Triantos  | 47/62 R      |

(Continued)

FOREIGN PATENT DOCUMENTS

JP         2000139248       *   5/2000   ............ A01G 27/00

OTHER PUBLICATIONS

Machine translation of JP2000139248 to Noumatsu, published May 2000.*

(Continued)

*Primary Examiner* — Kathleen Alker
(74) *Attorney, Agent, or Firm* — Charles W. Arnett; Faegre Baker Daniels LLP (57) ABSTRACT

An apparatus is provided for growing plants hydroponically. In one embodiment, the apparatus includes a plurality of containers each having a supply and a drain positioned above the supply. Methods of growing plants hydroponically in individual containers are also provided.

26 Claims, 10 Drawing Sheets

(56) References Cited

U.S. PATENT DOCUMENTS

| | | | |
|---|---|---|---|
| 9,374,951 B2 | 6/2016 | Church et al. | |
| 2006/0156624 A1 | 7/2006 | Roy | |
| 2007/0011944 A1* | 1/2007 | Triantos | 47/62 R |
| 2007/0271841 A1 | 11/2007 | Bissonnette et al. | |
| 2010/0154300 A1 | 6/2010 | Wiersma | |
| 2011/0023359 A1* | 2/2011 | Raring | 47/62 A |
| 2012/0000128 A1 | 1/2012 | Rochefort | |
| 2012/0090236 A1 | 4/2012 | Orr | |
| 2012/0186153 A1* | 7/2012 | Bradley | 47/60 |
| 2012/0192487 A1* | 8/2012 | Tanaka et al. | 47/60 |
| 2013/0055634 A1* | 3/2013 | Daniely et al. | 47/48.5 |
| 2014/0144078 A1* | 5/2014 | Gonyer et al. | 47/62 A |

OTHER PUBLICATIONS

Restriction Requirement mailed Oct. 22, 2014 in U.S. Appl. No. 13/803,474.
Election filed Dec. 22, 2014 in U.S. Appl. No. 13/803,474.
Office Action mailed Feb. 24, 2015 in U.S. Appl. No. 13/803,474.
Amendment filed Jul. 28, 2015 in U.S. Appl. No. 13/803,474.

* cited by examiner

APPARATUS AND METHOD FOR GROWING PLANTS HYDROPONICALLY IN CONTAINERS

RELATED APPLICATION

This application claims the benefit of U.S. Provisional Application Ser. No. 61/746,374, filed Dec. 27, 2012, titled APPARATUS AND METHOD FOR GROWING PLANTS HYDROPONICALLY IN CONTAINERS, the disclosure of which is expressly incorporated by reference herein.

FIELD

The present invention relates to methods and apparatus for growing plants hydroponically and in particular to methods and apparatus for growing plants hydroponically in isolated containers fed continuously or intermittently by one or more common reservoirs.

BACKGROUND

Water-culture hydroponics systems, in which roots are fully submerged and aerated in a water bath, address many nursery and research needs. Water-culture hydroponics systems are useful where roots are to be studied after controlled fluid treatments. However, typical systems expose plants simultaneously to a single solution and do not physically separate the plants from one another. Typical systems also do not allow for individual plant treatments.

SUMMARY

In an exemplary embodiment of the present disclosure, a hydroponics system for growing at least one plant, the at least one plant having roots is provided. The system comprises a container which receives the roots of the plant, the container including a lower half and an upper half, the roots of the plant extending from the upper half towards the lower half; a supply fluid conduit in fluid communication with an interior of the container, the supply fluid conduit providing fluid to the interior the container through a supply inlet provided in the bottom half of the container; and a return fluid conduit in fluid communication with the interior of the container, the return fluid conduit removing fluid from the interior of the container through a return inlet provided in the upper half of the container.

In another exemplary embodiment of the present disclosure, a hydroponics system for growing at least one plant, the at least one plant having roots is provided. The system comprises a reservoir storing a nutrient fluid for the roots of the at least one plant; a plurality of containers, each of the containers surrounding the roots of a respective plant of the at least one plant positioned in an interior of the container; a fluid supply system in fluid communication with an interior of the reservoir and in fluid communication with the interiors of the plurality of containers, the fluid supply system providing fluid from the interior of the reservoir to the interiors of the plurality of containers; an analysis system including a chamber in fluid communication with the interiors of the plurality of containers and with the interior of reservoir, the analysis system receiving fluid from the interiors of the plurality of containers into the chamber by a first gravity feed and providing the fluid from the chamber to the reservoir by a second gravity feed.

In still another exemplary embodiment, a hydroponics system for growing at least one plant, the at least one plant having roots is provided. The system comprises a reservoir storing a nutrient fluid for the roots of the at least one plant; a plurality of containers, each of the containers surrounding the roots of a respective plant of the at least one plant positioned in an interior of the container; a fluid supply system in fluid communication with an interior of the reservoir and in fluid communication with the interiors of the plurality of containers, the fluid supply system providing fluid from the interior of the reservoir to the interiors of the plurality of containers; a fluid return system in fluid communication with the interiors of the plurality of containers and with the interior of reservoir, the fluid return system receiving fluid from the interiors of the plurality of containers and returning the fluid to the reservoir; and a fluid measuring system which monitors a fluid level in the interior of the reservoir, the fluid level in the interior of the reservoir providing an indication of an amount of root growth in the plurality of containers.

In yet still another exemplary embodiment, a hydroponics system for growing at least one plant, the at least one plant having roots is provided. The system comprises a first reservoir storing a first nutrient fluid for a first portion of the roots of the at least one plant; a second reservoir storing a second nutrient fluid for a second portion of the roots of the at least one plant; a plurality of containers, each of the containers surrounding the roots of a respective plant of the at least one plant positioned in an interior of the container, each container having a first fluid chamber which receives the first portion of the roots of a respective plant and a second fluid chamber which receives the second portion of the roots of the respective plant; a first fluid supply system in fluid communication with an interior of the first reservoir and in fluid communication with the first fluid chambers of the plurality of containers, the first fluid supply system providing the first nutrient fluid from the interior of the first reservoir to the first fluid chambers of the plurality of containers; a first fluid return system in fluid communication with the interior of the first reservoir and in fluid communication with the first fluid chambers of the plurality of containers, the first fluid return system removing the first nutrient fluid from the first fluid chambers of the plurality of containers and returning the first nutrient fluid to the first reservoir; a second fluid supply system in fluid communication with an interior of the second reservoir and in fluid communication with the second fluid chambers of the plurality of containers, the second fluid supply system providing the second nutrient fluid from the interior of the second reservoir to the second fluid chambers of the plurality of containers; a second fluid return system in fluid communication with the interior of the second reservoir and in fluid communication with the second fluid chambers of the plurality of containers, the second fluid return system removing the second nutrient fluid from the second fluid chambers of the plurality of containers and returning the second nutrient fluid to the second reservoir, wherein the second nutrient fluid is kept segregated from the first nutrient fluid.

In still yet another exemplary embodiment, a method of monitoring root growth of the roots of a plant is provided. The method comprises providing a first fluid chamber holding a first nutrient fluid; placing a first portion of the roots in the first fluid chamber; providing a second fluid chamber holding a second nutrient fluid; and placing a second portion of the roots in the second fluid chamber.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to the growing plants hydroponically, it should be understood that the features disclosed herein may have application to the growth of other types of samples.

Figures 1, 1A:
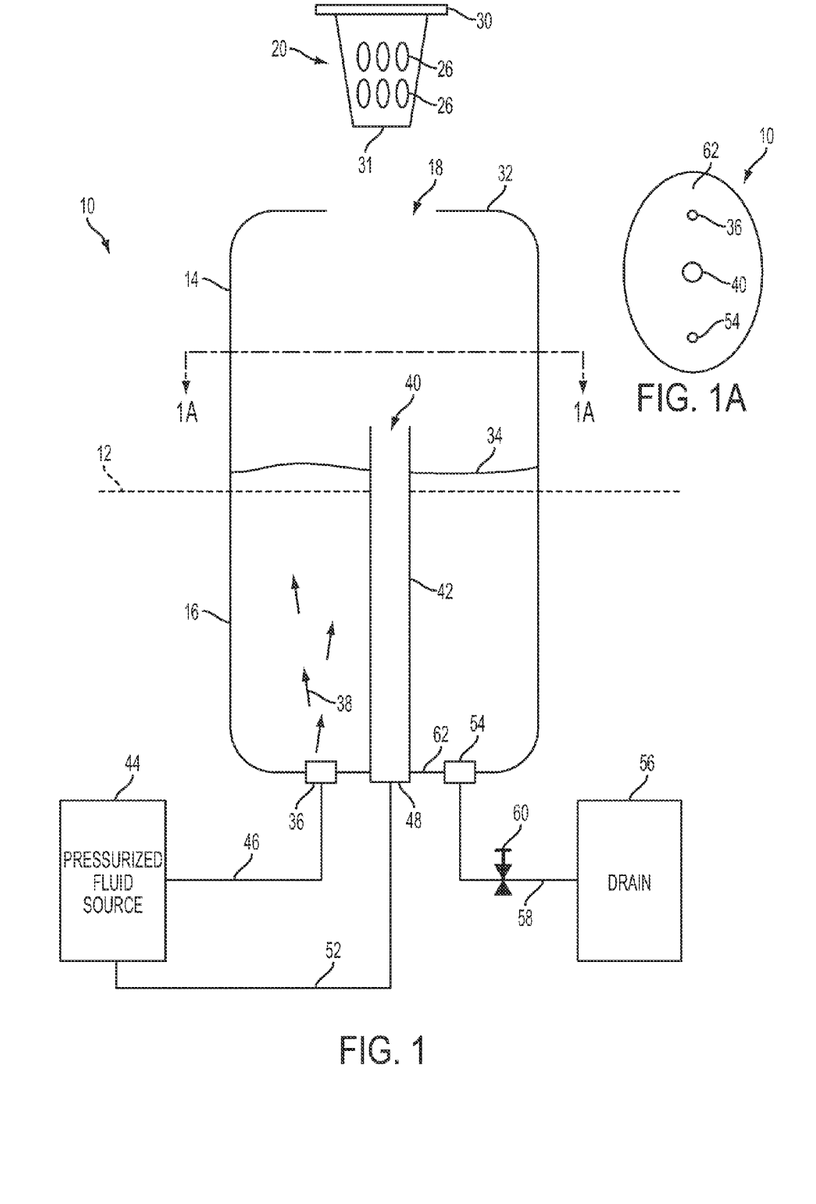
FIG. 1 is a side partial cutaway view of an exemplary growth chamber and plant support basket.
FIG. 1A is an overhead view of the exemplary growth container of FIG. 1 in the direction indicated by arrows 1A-1A.

Referring to FIG. 1, an exemplary container 10 for hydroponically growing plants is illustrated. In the exemplary embodiment illustrated in FIG. 1, Container 10 is divided by line 12 into an upper portion and a lower portion. In the illustrated embodiment, line 12 divides container 10 such that upper portion is the upper half 14 of container 10 and lower portion is the lower half 16 of container 10. In other embodiments, line 12 divides chamber into an upper portion that is larger than lower portion, or a lower portion that is larger than upper portion.

In the illustrated embodiment, container 10 includes an opening 18 into which a plant support basket 20 is positioned. Plant support basket 20 has an interior 22 into which a plant 24 is placed (see FIG. 2). The plant may be supported by a media in the plant support basket 20. Plant support basket 20 includes a plurality of openings 26 through which roots 28 of plant 24 are positioned. In one embodiment, the plurality of openings 26 are formed from spaces between ribs supporting plant 24 in plant support basket 20. Openings 26 allow the roots 28 of plant 24 to be submerged in or otherwise extend into fluid 34 in the interior of container 10. In one exemplary embodiment, plant support basket 20 is positioned directly above a return inlet 40 (discussed herein).

Illustratively, plant support basket 20 includes lip 30. Lip 30 is configured to be supported by a top surface of container 10 when plant support basket 20 is positioned in opening 18. In another embodiment, lip 30 is supported by an adaptor (not shown) that rests on a top surface of container 10. In one embodiment, the adaptor is two pieces of a support structure, such as boards, that include semi-circular openings that are aligned to form a circular opening that supports lip 30 and hence plant support basket 20.

The interior of container 10 is configured to hold a quantity of fluid 34. In one exemplary embodiment, the quantity of fluid is determined by the volume bounded by the return inlet 40, and a bottom 62 and walls of container 10. Exemplary fluids include water and nutrient-water solutions.

The fluid 34 is provided to the interior of container 10 through supply inlet 36. Supply inlet 36 is illustratively provided in the lower half 16 of container 10. Fluid 34 provides an upward flow, indicated by arrows 38, in the interior of container 10, helping to keep roots 28 from growing into supply inlet 36.

Fluid 34 is removed from the interior of container 10 through return inlet 40. Return inlet 40 is provided in a return extension tube 42 connecting return inlet 40 to return fitting 48. Return inlet 40 is illustratively positioned in the upper half 14 of the interior of container 10. Fluid 34 exits the bounded interior volume of container 10 through return fitting 48 positioned in lower half 16 of container 10.

Illustratively, return inlet 40 is positioned at a height above supply inlet 36, allowing a constant depth of fluid 34 in container 10 as long as fluid is flowing into supply inlet 36. In one exemplary embodiment, return inlet 40 is positioned about 1 inch from a bottom 31 of plant support basket 20. In another embodiment, return inlet 40 is positioned about 0.5 inches to about 1 inch from bottom 31 of plant support basket 20. In one embodiment, the distance between the return inlet 40 and bottom 31 of plant support basket 20 is selected to reduce root growth into return inlet 40. Root growth into supply inlet 36 is reduced by upward current of the fluid flowing from supply inlet 36 into return inlet 40. In yet still another embodiment, different plant support baskets 20 having different lengths between lip 30 and bottom 31 are used to vary the distance between return inlet 40 and bottom 31 of plant support basket 20. Other suitable distances between return inlet 40 and bottom 31 of plant support basket 20 may be used depending on the type of plant 24, length or roots 28, and depth of fluid desired. In one embodiment, return inlet 40 is provided in a wall in container 10.

In the exemplary embodiment illustrated in FIG. 1, the fluid 34 supplied to supply inlet 36 is supplied from pressurized fluid source 44 through supply conduit 46. In one embodiment, pressurized fluid source 44 includes a fluid pump 49 and fluid reservoir 50 (see FIG. 4). Fluid 34 from return fitting 48 is returned to reservoir 50 through return conduit 52 (see FIG. 4).

Illustratively, container 10 includes drain outlet 54 fluidly connected to a drain 56 by drain conduit 58. Drain conduit 58 includes one or more valves 60, such as a stopcock valve, to control the flow of fluid through drain outlet 54. In the exemplary embodiment illustrated in FIG. 1, drain outlet 54 is positioned lower than return inlet 40. Illustratively, drain outlet 54 is positioned at the same height or lower than supply inlet 36. In one embodiment, a sensor is provided below the stopcock valve to provide an indication of when the valve is leaking. In one embodiment, controller 109 monitors the sensor.

When valve 60 is opened, the level of fluid 34 in container 10 is lowered to about the position of drain outlet 54. In the exemplary embodiment illustrated in FIG. 1, draining fluid 34 through drain outlet 54 provides more complete draining of fluid 34 in container 10 than through return inlet 40.

In the illustrated embodiment, supply inlet 36, return fitting 48, and drain outlet 54 are positioned on the bottom 62 of container 10. In other embodiments, supply inlet 36, return fitting 48, and drain outlet 54 are positioned on a wall, a side, or other suitable portion of container 10. In one embodiment, the connections for supply inlet 36, return fitting 48, and drain outlet 54 are formed integrally with the container bottom.

Referring next to FIG. 1A, an overhead view of container 10 is shown in the direction of arrows 1A is illustrated. As shown in FIG. 1A, supply inlet 36 is positioned on a first side of return inlet 40 and drain outlet 54 is positioned on a second side of return inlet 40 opposite the first side. Also as shown in FIG. 1A, return inlet 40 is positioned between supply inlet 36 and drain outlet 54 on bottom 62 of container 10. Illustratively, each of supply inlet 36, return inlet 40, and drain outlet 54 are spaced apart from the walls of container 10.

Figure 2:
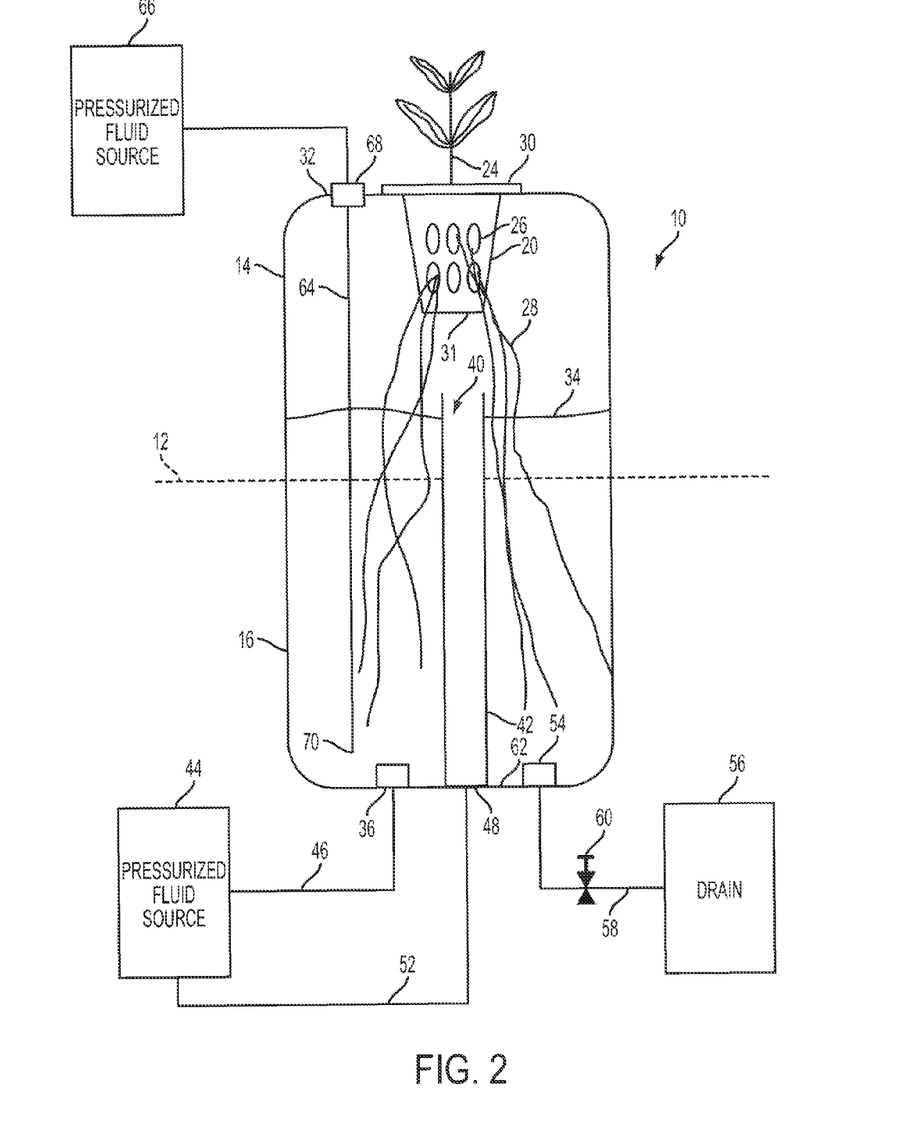
FIG. 2 is a side partial cutaway view of another exemplary growth container and plant support basket supporting at plant.

Referring next to FIG. 2, container 10 is illustrated with a plant 24 supported by plant support basket 20. As illustrated, plant 24 includes roots 28 extending from the upper half 14 of container 10 towards the lower half 16 of container 10.

As illustrated in FIG. 2, container 10 further includes a fluid conduit 64 fluidly connected to pressurized fluid source 66. Fluid conduit 64 is inserted through port 68 of container 10. Port 68 is illustratively on a top surface 32 of container 10, but in other embodiments is positioned on a side or bottom 62 surface of container 10. In the illustrated embodiment, fluid conduit 64 provides a gas which aerates the fluid 34 in container 10.

In the exemplary embodiment illustrated in FIG. 2, aeration fluid conduit 64 provides the fluid from pressurized fluid source to a position in container 10. Illustratively, bubbles from aeration fluid conduit 64 are formed in fluid 34 at an end 70 of aeration fluid conduit 64. In the illustrated embodiment, end 70 is positioned in the lower half 16 of container 10. An exemplary pressurized fluid source 66 is a pressurized supply of air or other gas.

Figures 3, 3A:
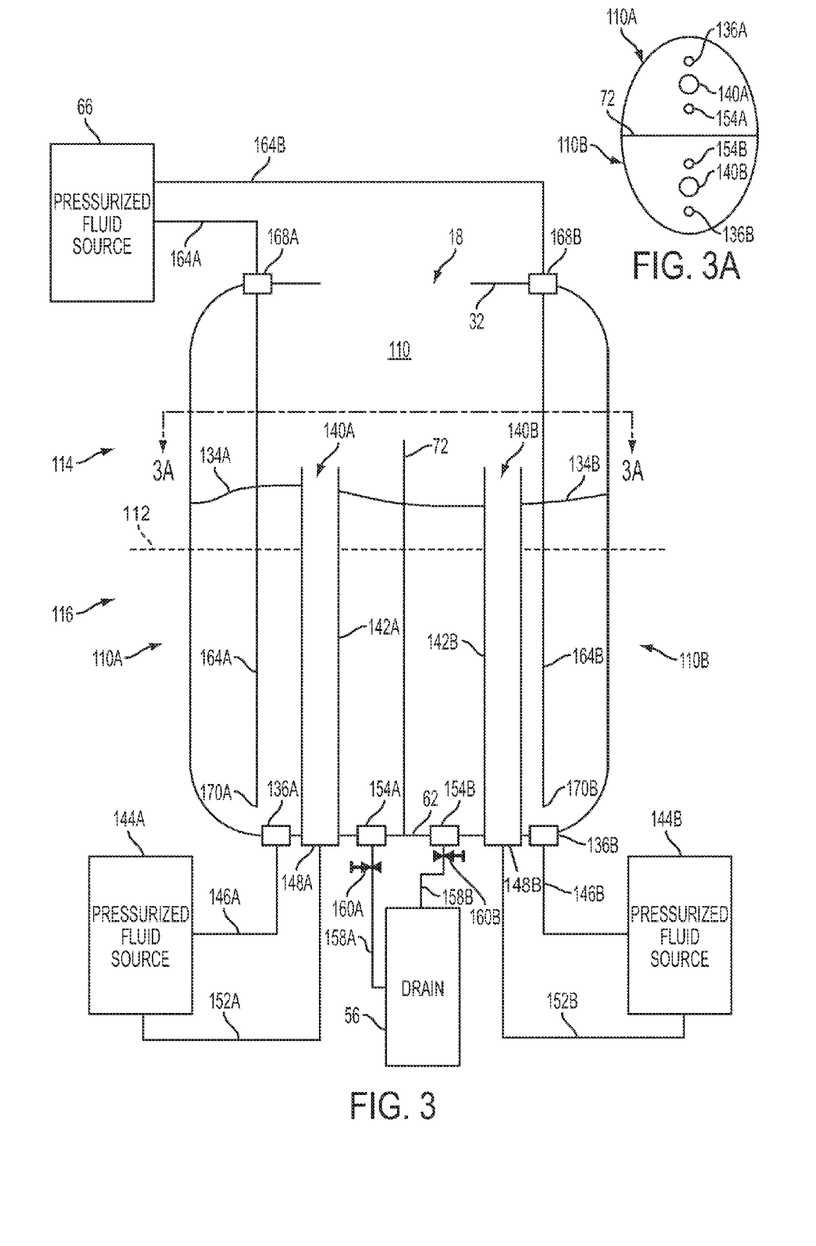
FIG. 3 is a side partial cutaway view of an exemplary two-chamber growth container.
FIG. 3A is an overhead view of the exemplary two-chamber growth container of FIG. 3 in the direction indicated by arrows 3A-3A.

Referring next to FIG. 3, an illustrative two-chamber growth container 110 is illustrated. Container 110 is similar to container 10. The interior of container 110 includes divider 72 dividing container 110 into first chamber 110A and second chamber 110B. As illustrated in FIG. 3, first chamber 110A and second chamber 110B may be fed with fluid 134A, 134B from separated pressurized fluid sources 144A, 144B to measure and determine the effect of different fluids 134A, 134B on root growth.

In the exemplary embodiment illustrated in FIG. 3, container 110 is divided by line 112 into an upper portion corresponding to upper half 114 and a lower portion corresponding to lower half 116. In other embodiments, line 112 divides chambers 110A, 110B into an upper portion that is larger than lower portion, or a lower portion that is larger than upper portion. As illustrated, a plant 24 in plant support basket 20 positioned in opening 18 includes roots 28 extending from the upper half 114 of container 110 towards the lower half 116 of container 110.

In the illustrated embodiment, container 110 includes an opening 18 into which a plant support basket 20 is positioned (see FIG. 2). Openings 26 in plant support basket 20 allow the roots 28 of plant 24 to be submerged in or otherwise extend into fluid 134A, 134B in the interior of container 110.

The first chamber 110A and second chamber 110B of container 110 are each configured to hold a quantity of fluid 134A or 134B. In the illustrated embodiment, divider 72 divides the interior of container 110 into equally sized first and second chambers 110A, 110B. In other embodiments, chambers 110A and 110B may be unequally sized. In one embodiment, more than one divider 72 is used to divide container 110 into at least three chambers.

For the following description, first chamber 110A will be exemplified. However, the teachings of first chamber 110A are equally applied to second chamber 110B, with the designation "B" replacing "A" in the part numbers except where indicated.

The fluid 134A is provided to the interior of first chamber 110A through supply inlet 136A. Fluid 134A is removed from the interior of first chamber 110A through return inlet 140A. Return inlet 140A is provided in return extension tube 142A connecting return inlet 140A to return fitting 148A. In one embodiment, return inlet is provided in a wall of container 110.

Illustratively, return inlet 140A is positioned at a height above supply inlet 136A, allowing a constant depth of fluid 134A in first chamber 110A as long as fluid is flowing into supply inlet 136A.

Illustratively, first chamber 110A includes drain outlet 154A fluidly connected to a drain 56 by drain conduit 158A. Illustratively, drain 56 is connected to drain outlet 154A and drain outlet 154B, although in other embodiments, separate drains 56 are used for each drain outlet 154A, 154B. Drain conduit 158A includes one or more valves 160A, such as a stopcock valve, to control the flow of fluid through drain outlet 154A. In the exemplary embodiment illustrated in FIG. 3, drain outlet 154A is positioned lower than return inlet 140A. Illustratively, drain outlet 154A is positioned at the same height or lower than supply inlet 136A.

When valve 160A is opened, the level of fluid 134A in first chamber 110A is lowered to about the position of drain outlet 154A. In the exemplary embodiment illustrated in FIG. 3, draining fluid 134A through drain outlet 154A provides more complete draining of fluid 134A in first chamber 110A than through return inlet 140A.

In the illustrated embodiment, supply inlets 136A, 136B, drain inlets 148A, 148B, and emptying inlets 154A and 154B are positioned on the bottom 62 of container 110. In other embodiments, one or more of supply inlets 136A, 136B, return inlets 148A, 148B, and drain outlets 154A and 154B are positioned on a wall, a side, or other suitable portion of container 110.

As illustrated, container 110 further includes aeration fluid conduit 164A fluidly connected to pressurized fluid source 66. Aeration fluid conduit 164A is inserted through aeration port 168A of container 110. Aeration port 168A is illustratively on a top surface 32 of container 110, but in other embodiments is positioned on a side or bottom 62 surface of container 110.

In the exemplary embodiment illustrated in FIG. 3, aeration fluid conduit 164A provides the fluid from pressurized fluid source 66 to a position in first chamber 110A. Illustratively, bubbles from aeration fluid conduit 164A are formed in fluid 134A at an end 170A of aeration fluid conduit 164A. An exemplary pressurized fluid source 66 is a pressurized supply of air or other gas.

Referring next to FIG. 3A, an overhead view of container 110 is shown in the direction of arrows 3A is illustrated. In the illustrated embodiment, supply inlet 136A is positioned on a first side of return extension tube 142A and drain outlet 154A is positioned on a second side of return extension tube 142A opposite the first side. Also in the illustrated embodiment, return extension tube 142A is positioned between supply inlet 136A and drain outlet 154A on bottom 62 of container 110.

As illustrated in FIG. 3A, second chamber 110B is arranged as a mirror image to first chamber 110A. In another embodiment (not shown), second chamber 110B is not arranged as a mirror image of first chamber 110A. In one embodiment, supply inlet 136B is positioned between return extension tube 142B and divider 72. In another embodiment, two or more of supply inlet 136A, return inlet 140A, and drain outlet 154A are arranged parallel to a length of divider 72.

Illustratively, each of the supply inlets 136A, 136B, return inlets 140A, 140B, and drain outlets 154A, 154B are spaced apart from the walls or sides of container 110.

Figure 4:
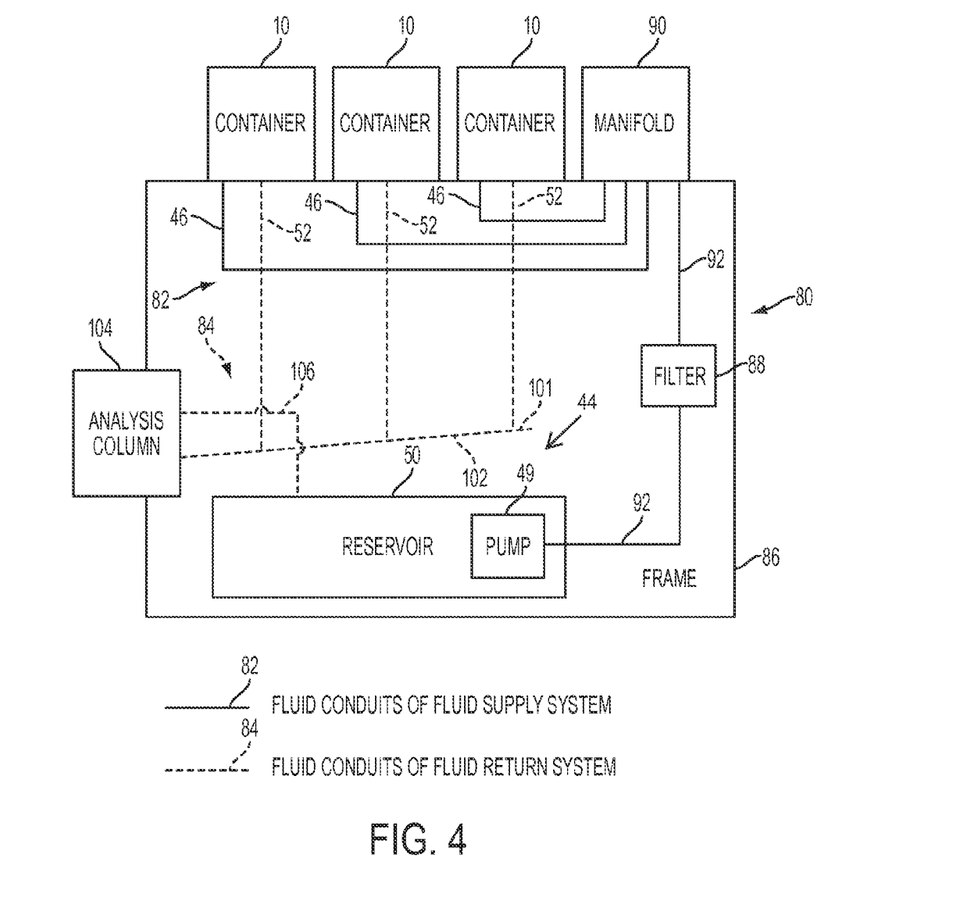
FIG. 4 illustrates an exemplary system for growing plants hydroponically in isolated containers.

Referring next to FIG. 4, an exemplary system 80 for growing plants hydroponically in isolated containers 10 is shown. Although illustrated as containers 10, in another embodiment, the system 80 includes one or more chambers 110 within a container. System 80 includes a fluid supply system 82 indicated by solid lines in FIG. 4 supplying fluid 34 to a plurality of containers 10 and a fluid return system 84 indicated by dashed lines returning fluid 34 from the plurality of containers 10 to a fluid reservoir 50.

In the exemplary embodiment illustrated in FIG. 4, system 80 includes frame 86 supporting the plurality of containers 10 and reservoir 50. Fluid 34 from reservoir 50 is pressurized by pump 49 and supplied to containers 10 through a filter 88 to remove solids from fluid 34. Exemplary pumps 49 include submersible pumps positioned in reservoir 50, but other suitable pumps and positions may also be used. After passing through the filter 88, the fluid 34 is distributed to the plurality of containers 10 by a manifold 90.

Figure 5:
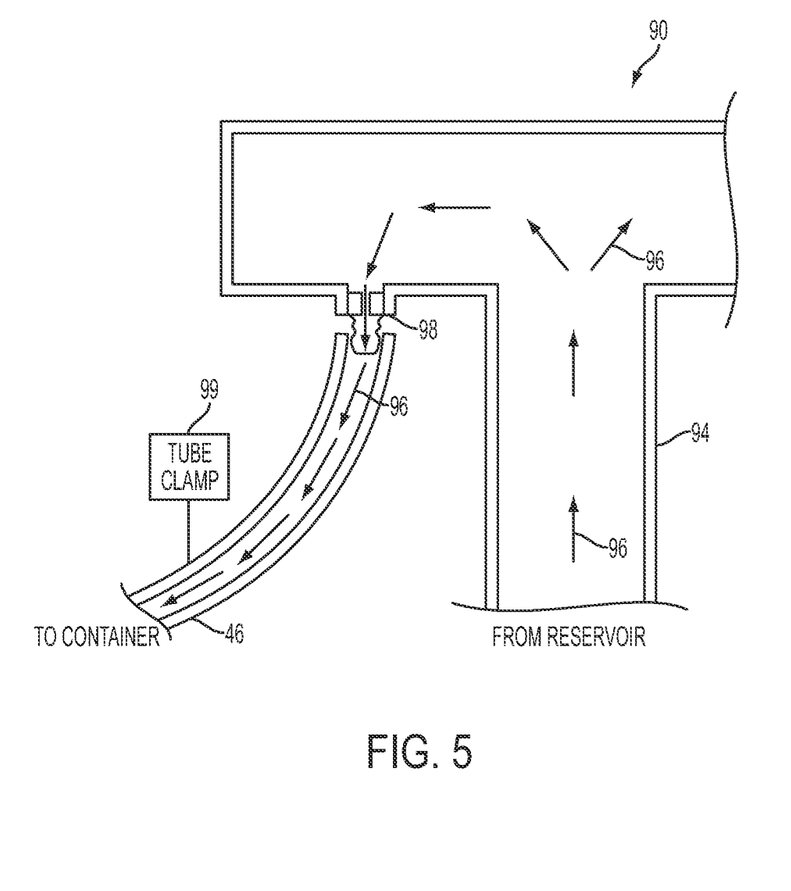
FIG. 5 is a side cutaway view of an exemplary manifold for use with the exemplary system of FIG. 4.

Referring next to FIG. 5, a side cutaway view of an exemplary manifold 90 is illustrated. Exemplary manifolds 90 include those disclosed in U.S. Pat. No. 5,054,690, the disclosure of which is expressly incorporated by reference herein, and available as Xeri-Bird 8 Multi Outlet Emission Device from Rain Bird Corporation, Azusa, Calif.

Pressurized fluid 34 is supplied to manifold 90 from pump 49 through supply conduit 92 (see FIG. 4). Fluid 34 enters manifold 90 through main chamber 94 (see FIG. 5) and is distributed, as shown by the fluid flow arrows 96, to a plurality of supply conduits 46, each leading to a separate container 10. The fluid supply system is regulated to provide a first flow rate to a first container and a second flow rate to a second container, the second flow rate being different than the first flow rate. The fluid 34 illustratively flows through a restrictor adaptor 98 in manifold 90. Restrictor adaptor 98 reduces the flow rate from the main chamber 94 of manifold 90 for flow through supply conduit 46. In one exemplary embodiment, restrictor adaptor 98 includes an adjustable orifice, allowing a user to adjust the flow rate through supply conduit 46. As illustrated in FIG. 5, a conduit clamp 99 is provided which can selectively further restrict or prevent the flow of fluid 34 through supply conduit 46. In one embodiment, conduit clamp 99 prevents fluid from siphoning from the interior of container 10 and mixing between containers 10. In one embodiment, conduit clamp 99 is a clamp. In another embodiment, conduit clamp 99 is a one way valve that allows fluid to flow into the interior of container 10 through supply inlet 36, but not from the interior of container 10 into the manifold 90.

Referring again to FIG. 4, the fluid return system 84 includes return conduit 52 connecting to the return fitting 48 of each container 10. Return line 102 collects the fluid 34 from the plurality of return conduits 52 from each container 10 and supplies the fluid 34 to an analysis system including analysis column 104. Return line 102 illustratively includes vent 101 to assist in the flow of fluid through return line 102. Fluid flows from analysis column 104 back to fluid reservoir 50 through return line 106. In another exemplary embodiment (not shown), a return line 102 is attached to the return fittings 48 of the containers 10, while a second return line is attached to the drain outlet 54 of the containers 10.

In the exemplary embodiment illustrated in FIG. 4, the end of return line 102 attached to analysis column 104 is lower than the connections of return line 102 with return conduit 52. This allows return line 102 to be gravity fed.

Figure 6:
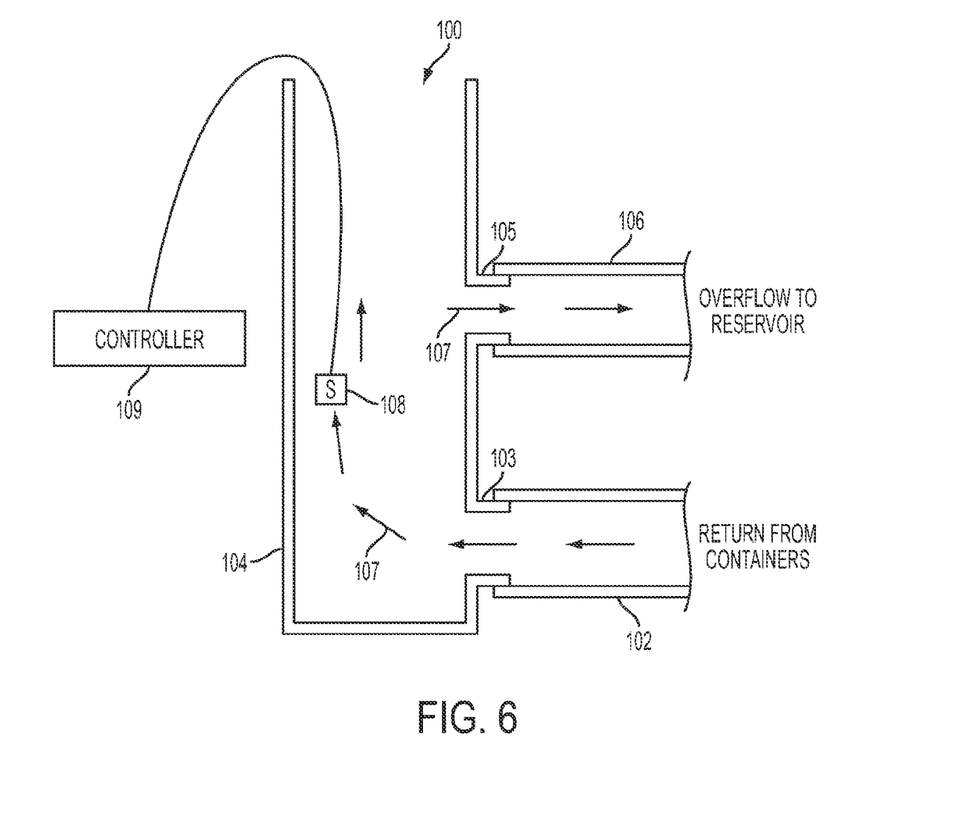
FIG. 6 is a side cutaway view of an exemplary analysis column for use with the exemplary system of FIG. 4.

Referring next to FIG. 6, a side cutaway view of an exemplary analysis system including analysis column 104 is illustrated. Analysis column 104 includes a chamber that receives fluid 34 from the interiors of the plurality of containers 10 by a first gravity feed and provides the fluid from the chamber to the reservoir 50 by a second gravity feed. Illustratively, analysis column 104 includes an open upper portion 100 allowing visual inspection of the fluid 34 within the analysis column 104.

As shown in the illustrated embodiment, return line 102 connects to analysis column 104 at a connection 103 below a connection 105 between analysis column 104 and return line 106. In addition, connection 105 is positioned lower than the connections of return line 102 with return conduit 52. This arrangement allows fluid to circulate by gravity feed through analysis column 104 as shown by arrows 107 from return line 102 through connection 103, up through analysis column 104, and through connection 105 and return line 106 before returning it to reservoir 50.

In another exemplary embodiment, return line 102 discards fluid collected from containers 10 to drain 56 (see FIG. 1) after collecting the fluid. The fluid 34 may be discarded before or after it is analyzed in the analysis column.

As illustrated in FIG. 6, sensor 108 is positioned in the interior of analysis column 104 in the fluid flow through the column shown by arrows 107. At least one fluid characteristic of the fluid 34 in analysis column 104 is measured by sensor 108. Exemplary sensors include pH meters, concentration monitors, systems for measuring total solids and total dissolved solids, sensors to measure or identify specific substances, and other suitable instruments. Sensor 108 is illustratively operably connected to a controller 109 through an open upper portion 100 of analysis column 104, although in other embodiments, sensor 108 may be independent of controller 109, connected through a side of analysis column, wirelessly connected to controller 109, or controller 109 may be positioned in the interior of analysis column 104. Other suitable arrangements, depending on the sensor 108 and controller 109 selected, may also be used.

In one embodiment, a sensor is provided or the pump is monitored by controller 109 to determine if filter 88 is plugged. If a determination is made that filter 88 is plugged, controller 109 provides an indication of the plugged state to a remote device. In one example, a status value is made available over the Internet.

Figure 7:
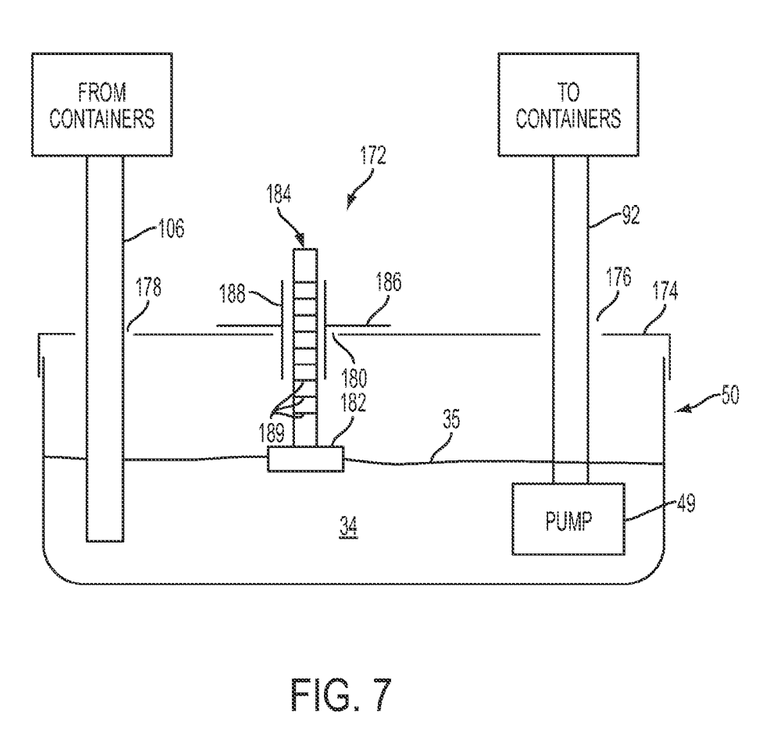
FIG. 7 is an exemplary reservoir and exemplary fluid measuring system for use with the exemplary system of FIG. 4.

Referring next to FIG. 7, an exemplary reservoir 50 and fluid measuring system 172 is illustrated. Reservoir 50 includes a lid 174 covering a top opening of reservoir 50. Lid 174 includes a first hole 176 through which supply conduit 92 provides fluid pressurized by pump 49 to the containers 10 (see FIG. 4). Lid 174 includes a second hole 178 through which fluid is returned to reservoir 50 through return line 106. Lid 174 further includes a third hole 180 in which fluid measuring system 172 is positioned. In other embodiments (not shown) two or more of the holes 176, 178, 180 are provided as a single opening.

Fluid measuring system 172 includes a float 182 and a measurement member 184 extending vertically from the float 182 through third hole 180. Fluid measuring system 172 illustratively floats on a top level 35 of fluid 34 in reservoir 50. Third hole 180 is illustratively provided with cover 186 and horizontal supports 188. Measurement member 184 includes a plurality of indicators 189 corresponding to the amount of fluid in reservoir 50. As the level of fluid 34 in reservoir 50 decreases, the top level 35 of the fluid 34 will decrease in height, and fluid measuring system 172 will be positioned lower in reservoir 50. In the exemplary embodiment, the relative position of the indicators 189 to the horizontal support or guide 188 provides an indication of the current level of fluid is the reservoir 50. In some embodiments, changes in the amount of fluid 34 in reservoir 50 provides an indication of an amount of growth of roots 28 of plants 24 in containers 10. As the root growth in containers 10 increases the available space for fluid decreases, thereby raising the fluid level in reservoir 50.

Figure 8:
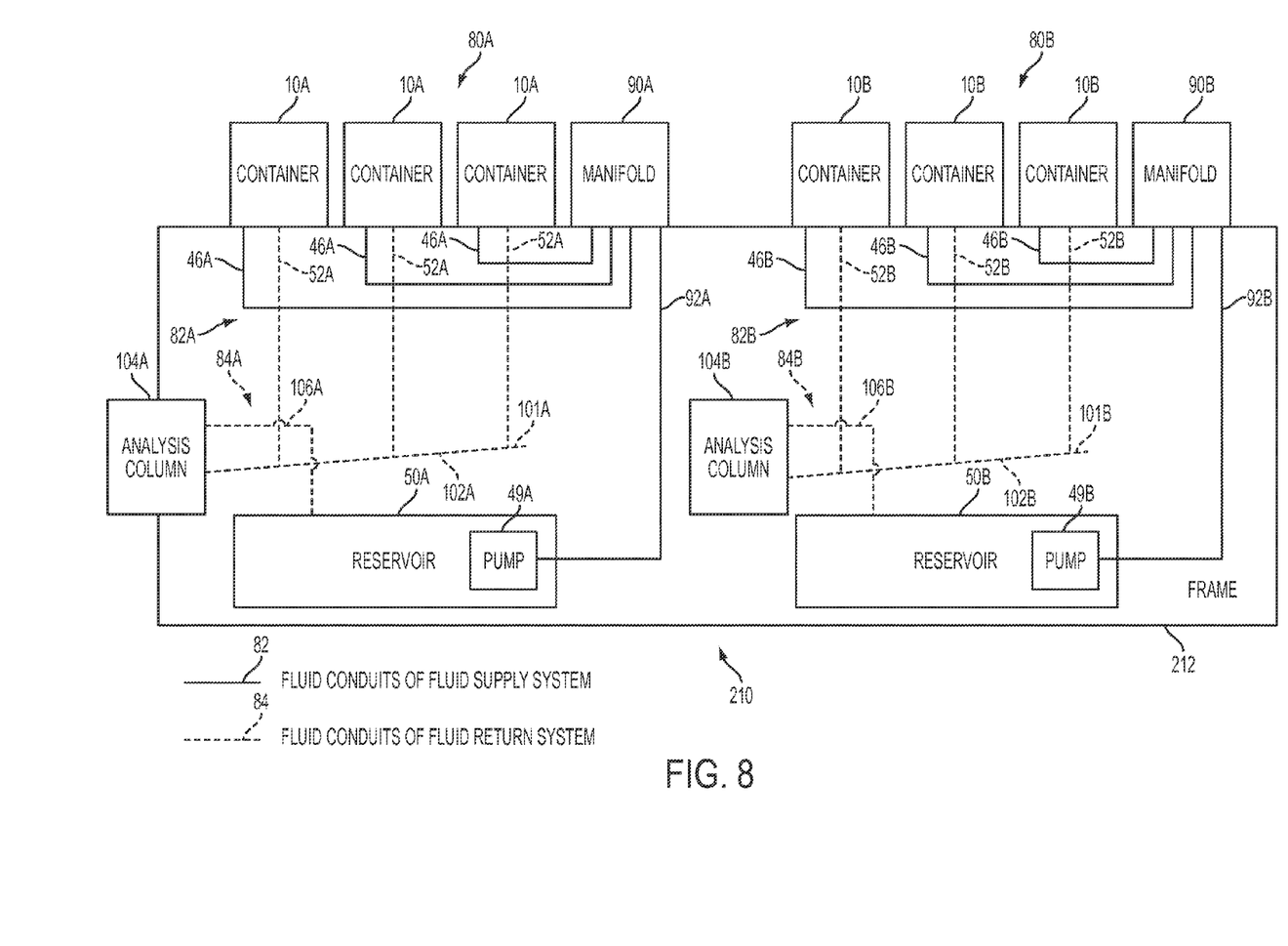
FIG. 8 illustrates an exemplary system for growing plants hydroponically in isolated containers with multiple reservoirs.

Referring next to FIG. 8, another exemplary system 210 is illustrated. System 210 includes two independent systems 80A and 80B similar to system 80 on a common frame 212. Systems 80A and 80B are independent systems having a first fluid reservoir 50A, a first fluid supply system 82A, and a first fluid return system 84A connected to a first plurality of containers 10A and a second fluid reservoir 50B, a second fluid supply system 82B, and a second fluid return system 84B connected to a second plurality of containers 10B.

For the following description, first system 80A will be exemplified. However, the teachings of first system 80A can be equally applied to second system 80B, with the designation "B" replacing "A" in the part numbers except where indicated.

First system 80A includes a first fluid supply system 82A indicated by solid lines in FIG. 8 supplying a first fluid 34A to a first plurality of containers 10A and a first fluid return system 84A indicated by dashed lines returning first fluid 34A from the first plurality of containers 10A to a first fluid reservoir 50A. First fluid 34A from first reservoir 50A is pressurized by first pump 49A and distributed to the first plurality of containers 10A by manifold 90A.

The first fluid return system 84A includes return conduit 52A connecting to the return fitting 48 of each of the first plurality of containers 10A (see FIG. 1). First return line 102A collects the first fluid 34A from the plurality of return conduits 52A from each of the first plurality of containers 10A and supplies the first fluid 34A to the first analysis column 104A. First return line 102A illustratively includes vent 101A to assist in the flow of fluid through first return line 102A. The first fluid 34 flows from the first analysis column 104A back to the first fluid reservoir 50A through first return line 106A. In the illustrated embodiment, the end of the first return line 102A attached to the first analysis column 104A is lower than the connections of the first return line 102A with the first return conduit 52A. Further, the first return line 102A connects to the first analysis column 104A at a connection below a connection between the first analysis column 104A and the first return line 106A, allowing the first fluid return system 84A to be gravity fed.

Figure 9:
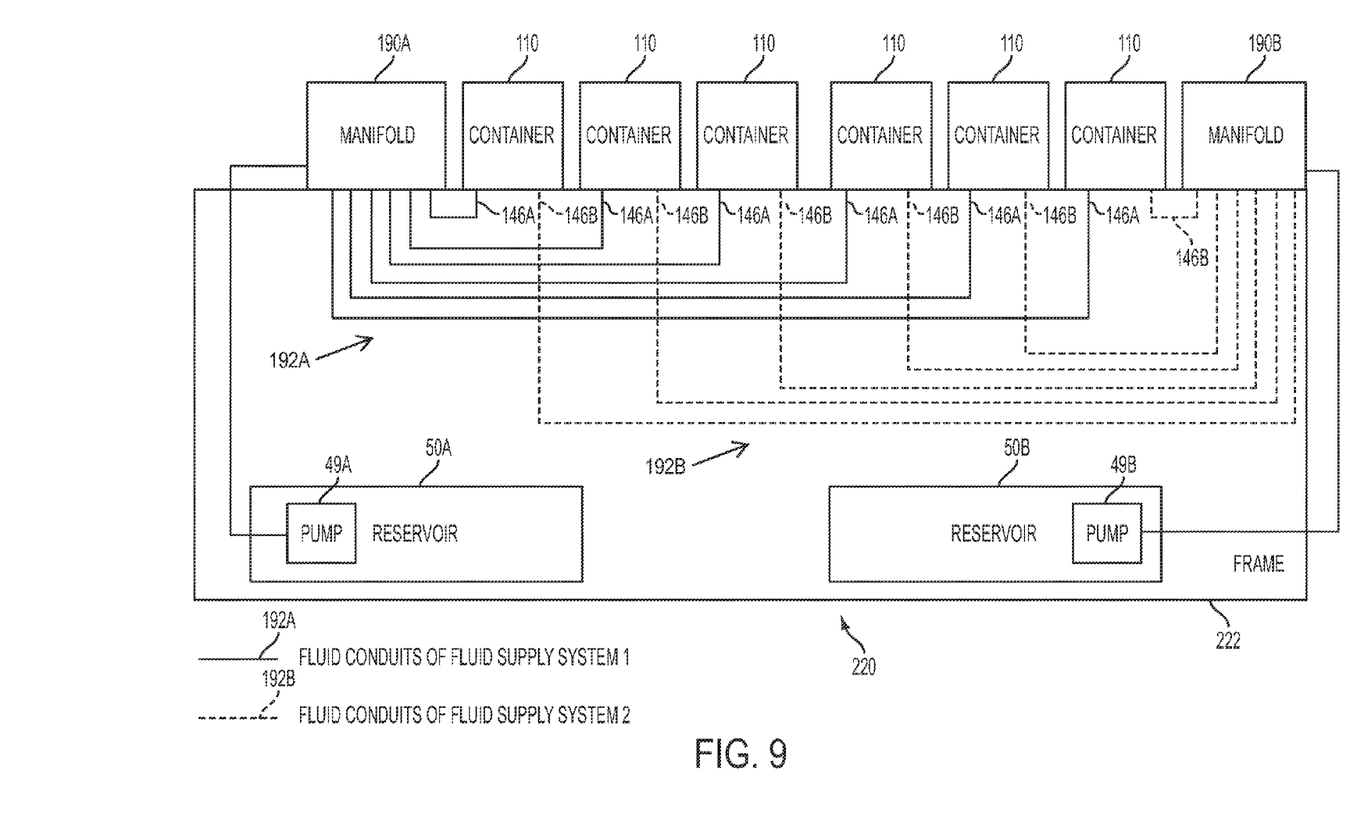
FIG. 9 illustrates the supply system of an exemplary system for growing plants hydroponically in two-chamber growth containers.
Figure 10:
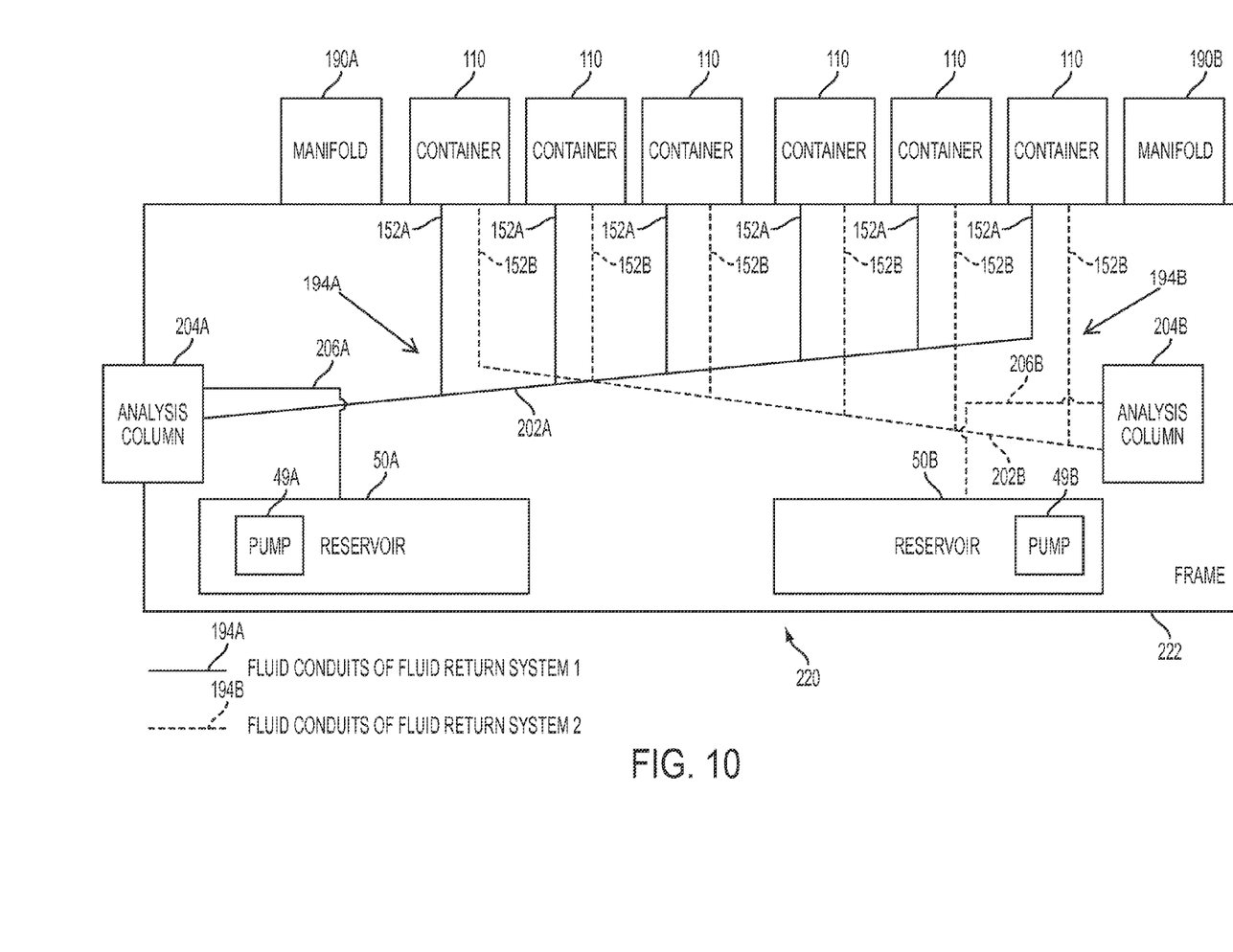
FIG. 10 illustrates the return system of an exemplary system of FIG. 9.

Referring next to FIGS. 9 and 10, still another exemplary system 220 is illustrated. System 220 is similar to system 80 and system 210. System 220 includes a plurality of two-chamber growth containers 110. System 220 includes a first fluid system 220A supplying the first chambers 110A of the plurality of growth chambers 110 and a second fluid system supplying the second chambers 110B of the plurality of growth chambers 110 on a common frame 222. FIG. 9 illustrates the first fluid supply system 192A and second fluid supply system 192B of system 220. FIG. 10 illustrates the first fluid return system 194A and the second fluid return system 194B of system 220.

Referring first to FIG. 9, a pressurized first fluid 134A is supplied from a first fluid reservoir 50A by a first pump 49A to a first manifold 190A, which distributes the first fluid 134A to the first chambers 110A of the plurality of chambers 110. A pressurized second fluid 134B is supplied from a second fluid reservoir 50B by a second pump 49B to a second manifold 190B, which distributes the second fluid 134B to the second chambers 110B of the plurality of chambers 110.

Referring next to FIG. 10, the first fluid return system 194A includes return conduit 152A connecting to the first return inlet 148A of the first chamber 110A of each of the plurality of chambers 110 (see FIG. 3). First return line 202A collects the first fluid 134A from the plurality of return conduits 152A from the first chamber 110A of each of the plurality of chambers 110 and supplies the first fluid 134A to the first analysis column 204A. First return line 202A illustratively includes a vent to assist in the flow of fluid through first return line 202A. The first fluid 134A flows from the first analysis column 204A back to the first fluid reservoir 50A through first return line 206A. In the illustrated embodiment, the end of the first return line 202A attached to the first analysis column 204A is lower than the connections of the first return line 202A with the first return conduit 152A. Further, the first return line 202A connects to the first analysis column 204A at a connection below a connection between the first analysis column 104A and the first return line 206A, allowing the first fluid return system 194A to be gravity fed.

The second fluid return system 194B includes return conduit 152B connecting to the second drain inlet 148B of the second chamber 110B of each of the plurality of chambers 110 (see FIG. 3). Second return line 202B collects the second fluid 134B from the plurality of return conduits 152B from the second chamber 110B of each of the plurality of chambers 110 and supplies the second fluid 134B to the second analysis column 204B. Second return line 202B illustratively includes a vent to assist in the flow of fluid through second return line 202B. The second fluid 134B flows from the second analysis column 204B back to the second fluid reservoir 50B through second return line 206B. In the illustrated embodiment, the end of the second return line 202B attached to the second analysis column 204B is lower than the connections of the second return line 202B with the second return conduit 152B. Further, the second return line 202B connects to the second analysis column 204B at a connection below a connection between the second analysis column 104B and the second return line 206B, allowing the second fluid return system 194B to be gravity fed.

In one embodiment, the containers and fluid carrying portions of the disclosed systems are generally light-proof to keep the fluid generally non-exposed to light.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A hydroponics system for growing at least one plant, the at least one plant having roots, the system comprising:
a container sized to receive the roots of the at least one plant, the container including a lower half and an upper half, and sized such that the roots of the at least one plant extend from the upper half towards the lower half;
a supply fluid conduit in fluid communication with an interior of the container, the supply fluid conduit adapted to provide fluid to the interior of the container through a supply inlet provided in the lower half of the container;
a return fluid conduit in fluid communication with the interior of the container, the return fluid conduit adapted to remove fluid from the interior of the container through a return inlet provided in the upper half of the container via a return outlet in the lower half of the container;
a reservoir having a reservoir outlet fluidly connected to the supply fluid conduit and a reservoir inlet fluidly connected to the return fluid conduit, the reservoir positioned below the container such that fluid can flow from the return inlet of the container to the reservoir inlet via a gravity feed through the return fluid conduit;
an analysis column fluidly connected to the return fluid conduit between the container and the reservoir, the analysis column comprising:
a column inlet at a first height below the container and above the reservoir; and
a column outlet at a second height below the container, above the reservoir and above the column inlet, such that the gravity feed alone causes fluid to flow upwardly from the column inlet to the column outlet; and
an auxiliary fluid connection provided in the lower half of the container.

2. The hydroponics system of claim 1, wherein the container includes at least one wall, the return inlet of the return fluid conduit spaced apart from the at least one wall of the container.

3. The hydroponics system of claim 1, wherein the container bounds an interior volume including the return inlet of the return fluid conduit.

4. The hydroponics system of claim 3, wherein the fluid entering the return inlet exits the bounded interior volume of the container through the lower half of the container.

5. The hydroponics system of claim 4, wherein the fluid enters the bounded interior volume through a bottom of the container and exits the bounded interior volume through the bottom of the container.

6. The hydroponics system of claim 1, further comprising a basket supported by the container, the basket supporting the at least one plant and including a plurality of openings through which the roots of the at least one plant extend.

7. The hydroponics system of claim 6, wherein the basket is directly above the return inlet of the return fluid conduit.

8. The hydroponics system of claim 1, further comprising a second supply fluid conduit in fluid communication with the interior of the container, the second supply fluid conduit providing a second fluid to the interior of the container through a second supply inlet provided in the upper half of the container.

9. The hydroponics system of claim 8, wherein the supply fluid conduit is in fluid communication with a first pressurized fluid source and the second supply fluid conduit is in fluid communication with a second pressurized fluid source.

10. The hydroponics system of claim 9, wherein the first pressurized fluid source provides a pressurized liquid to the interior of the container and the second pressurized fluid source provides a pressurized air to the interior of the container.

11. The hydroponics system of claim 1, wherein the auxiliary fluid connection comprises a drain outlet formed in a bottom of the container.

12. A hydroponics system for growing at least one plant, the at least one plant having roots, the system comprising:
a reservoir adapted to store a nutrient fluid for the roots of the at least one plant;
a plurality of containers, each of the containers sized to surround the roots of a respective plant of the at least one plant positioned in an interior of the container;
a fluid supply system in fluid communication with an interior of the reservoir and in fluid communication with the interiors of the plurality of containers, the fluid supply system adapted to provide the fluid from the interior of the reservoir to the interiors of the plurality of containers;
an analysis system including a chamber in fluid communication with the interiors of the plurality of containers and with the interior of the reservoir, the analysis system comprising:
a chamber inlet positioned at a first height and configured to receive the fluid from the interiors of the plurality of containers into the chamber by a first gravity feed; and
a chamber outlet positioned at a second height, the second height being above the first height, the chamber outlet configured to provide the fluid from the chamber to the reservoir by a second gravity feed, such that fluid flowing downwardly from the plurality of containers toward the reservoir under the force of gravity temporarily flows upwardly from the chamber inlet to the chamber outlet via the first and second gravity feed and without the use of a pump, such that the temporary upward flow through the chamber is due solely to the positioning and configuration of the chamber relative to the containers and the reservoir.

13. The hydroponics system of claim 12, wherein the chamber of the analysis system is positioned lower than the interiors of the plurality of containers and the reservoir is positioned lower than the chamber of the analysis system.

14. The hydroponics system of claim 12, further comprising a sensor positioned to monitor at least one characteristic of the fluid in the chamber of the analysis system.

15. The hydroponics system of claim 14, wherein the sensor is positioned between the chamber inlet and the chamber outlet.

16. The hydroponics system of claim 12, wherein the chamber includes an open upper portion to provide visual inspection of the fluid within the chamber.

17. The hydroponics system of claim 16, wherein the chamber outlet is formed in a sidewall of the chamber below the open upper portion, whereby the temporary upward flow of the fluid through the chamber exits the chamber through the chamber outlet before reaching the open upper portion.

18. The hydroponics system of claim 12, wherein the fluid supply system is regulated to provide a first flow rate to a first container and a second flow rate to a second container, the second flow rate being different than the first flow rate.

19. The hydroponics system of claim 12, further comprising a fluid measuring system which monitors a fluid level in the interior of the reservoir, the fluid level in the interior of the reservoir providing an indication of an amount of root growth in the plurality of containers.

20. The hydroponics system of claim 12, wherein:
each of the containers includes a lower half and an upper half and wherein each of the containers is sized to support a respective plant of the at least one plant, such that the roots of the respective plant extend from the upper half of the respective container towards the lower half of the respective container;
the fluid supply system comprises a supply fluid conduit in fluid communication with the interior of each of the containers and the reservoir, the supply fluid conduit providing the fluid to the interior of the container through a supply inlet provided in the lower half of the container; and
wherein the hydroponic system further comprises a return fluid conduit in fluid communication with the interior of each container, the return fluid conduit removing the fluid from the interior of each container through a return inlet provided in the upper half of each container, the fluid being returned to the reservoir.

21. The hydroponics system of claim 12, wherein the fluid is provided to the interiors of the plurality of containers continuously.

22. The hydroponics system of claim 12, wherein the fluid is provided to the interiors of the plurality of containers intermittently.

23. The hydroponics system of claim 12, wherein the analysis system is adapted to receive the fluid from the interiors of the plurality of containers into the chamber solely by a first gravity feed and adapted to provide the fluid from the chamber to the reservoir solely by a second gravity feed.

24. A hydroponics system for growing at least one plant, the at least one plant having roots, the system comprising:
a reservoir adapted to store a nutrient fluid for the roots of the at least one plant;
a lid covering a top opening of the reservoir, the lid including a first hole, a second hole and a third hole;
a plurality of containers disposed above the reservoir, each of the containers having a lower half and an upper half sized to surround the roots of a respective plant of the at least one plant positioned in an interior of the container such that the roots of the at least one plant extend from the upper half towards the lower half, each container comprising:
a supply inlet provided in the lower half of the container;
a return outlet formed in a wall of the container at the lower half of the container;
an extension tube having an end coupled to the return outlet and extending upwardly into the container, a return inlet formed at an opposing end of the extension tube in the upper half of the container;
a fluid supply system in fluid communication with an interior of the reservoir via a fluid supply conduit received in the first hole of the lid, and in fluid communication with the interiors of the plurality of containers via the supply inlet of each container, the fluid supply system including a pressurized fluid source adapted to provide the fluid from the interior of the reservoir to the interiors of the plurality of containers, and to drive fluid upwardly from the supply inlet to the return inlet in each container;
a fluid return system in fluid communication with the interiors of the plurality of containers and with the interior of reservoir via a return line received in the second hole of the lid, the fluid return system adapted to receive the fluid from the interiors of the plurality of containers via the return outlet of each container and adapted to return the fluid to the reservoir under the force of gravity;
a fluid measuring system received in the third hole of the lid, the fluid measuring system adapted to monitor a fluid level in the interior of the reservoir, the fluid level in the interior of the reservoir providing an indication of an amount of root growth in the plurality of containers; and
an analysis system including a chamber in fluid communication with the interiors of the plurality of containers and with the interior of the reservoir, the analysis system comprising:
a chamber inlet positioned at a first height and configured to receive the fluid from the interiors of the plurality of containers into the chamber by a first gravity feed; and
a chamber outlet positioned at a second height, the second height being above the first height, the chamber outlet configured to provide the fluid from the chamber to the reservoir by a second gravity feed, such that fluid flowing downwardly from the plurality of containers toward the reservoir under the force of gravity temporarily flows upwardly from the chamber inlet to the chamber outlet via the first and second gravity feed and without the use of a pump, such that the temporary upward flow through the chamber is due solely to the positioning and configuration of the chamber relative to the containers and the reservoir.

25. The hydroponics system of claim 24, wherein the fluid measuring system includes a first portion supported by the reservoir and a second portion supported by the fluid within the interior of the reservoir, a position of the second portion relative to the first portion providing an indication of the fluid level in the interior of the reservoir.

26. The hydroponics system of claim 25, wherein the second portion includes a float and a vertically extending measurement member supported by the float and wherein the first portion includes a guide which receives the vertically extending measurement member.

* * * * *